United States Patent
Zhang et al.

(10) Patent No.: US 11,908,236 B2
(45) Date of Patent: Feb. 20, 2024

(54) ILLUMINATION DETECTION METHOD AND APPARATUS FOR FACE IMAGE, AND DEVICE AND STORAGE MEDIUM

(71) Applicant: BIGO TECHNOLOGY PTE. LTD., Singapore (SG)

(72) Inventors: Feiqian Zhang, Guangzhou (CN); Gengdai Liu, Guangzhou (CN); Leju Yan, Guangzhou (CN)

(73) Assignee: BIGO TECHNOLOGY PTE. LTD., Singapore (SG)

(*) Notice: Subject to any disclaimer, the term of this patent is extended or adjusted under 35 U.S.C. 154(b) by 330 days.

(21) Appl. No.: 17/417,003

(22) PCT Filed: Dec. 4, 2019

(86) PCT No.: PCT/CN2019/123006
§ 371 (c)(1),
(2) Date: Jun. 21, 2021

(87) PCT Pub. No.: WO2020/134925
PCT Pub. Date: Jul. 2, 2020

(65) Prior Publication Data
US 2022/0075992 A1 Mar. 10, 2022

(30) Foreign Application Priority Data
Dec. 28, 2018 (CN) .......................... 201811627209.5

(51) Int. Cl.
*G06V 40/16* (2022.01)
*G06V 10/46* (2022.01)
(Continued)

(52) U.S. Cl.
CPC ............ *G06V 40/168* (2022.01); *G06T 17/20* (2013.01); *G06V 10/462* (2022.01); *G06V 10/60* (2022.01)

(58) Field of Classification Search
CPC .... G06V 40/168; G06V 10/462; G06V 10/60; G06V 40/172; G06V 20/64; G06T 17/20
See application file for complete search history.

(56) References Cited

U.S. PATENT DOCUMENTS 6,072,496 A * 6/2000 Guenter ............... G06V 40/166
345/419
9,710,912 B2 * 7/2017 Kim ........................ G06T 7/344
(Continued)

FOREIGN PATENT DOCUMENTS

| CN | 101159015 A | 4/2008 |
| CN | 101320484 A | 12/2008 |

(Continued)

OTHER PUBLICATIONS

International Search Report of the International Searching Authority for China National Intellectual Property Administration in PCT application No. PCT/CN2019/123006 dated Mar. 6, 2020, which is an international application corresponding to this U.S. application.

(Continued)

*Primary Examiner* — Wesley J Tucker
(74) *Attorney, Agent, or Firm* — Kolitch Romano Dascenzo Gates LLC (57) ABSTRACT

An illumination detection method comprises acquiring a face image to be detected and a three-dimensional face mesh template; deforming the three-dimensional face mesh template according to the face image to obtain a reconstructed face mesh model; according to the deformation positions, in the reconstructed face mesh model, of key feature points in the three-dimensional face mesh template, determining the brightness of feature points, corresponding to the key feature points, in the face image; and according to the relationship between the predetermined brightness of the key feature points and the illumination, and the brightness of the feature (Continued)

points, corresponding to the key feature points, in the face image, determining illumination information of the face image.

14 Claims, 3 Drawing Sheets

(51) Int. Cl.
*G06V 10/60* (2022.01)
*G06T 17/20* (2006.01)

(56) References Cited

U.S. PATENT DOCUMENTS

| | | | |
|---|---|---|---|
| 11,003,897 B2* | 5/2021 | You | G06T 19/20 |
| 11,562,597 B1* | 1/2023 | Kim | G06N 3/045 |
| 2007/0091085 A1* | 4/2007 | Wang | G06T 7/55 345/420 |
| 2007/0127787 A1 | 6/2007 | Castleman et al. | |
| 2009/0153553 A1* | 6/2009 | Kim | G06T 13/40 345/419 |
| 2010/0134487 A1 | 6/2010 | Lai et al. | |
| 2012/0183238 A1 | 7/2012 | Savvides et al. | |
| 2015/0084950 A1* | 3/2015 | Li | G06T 7/251 345/419 |
| 2017/0091529 A1 | 3/2017 | Beeler et al. | |
| 2017/0161942 A1 | 6/2017 | Deshwal et al. | |
| 2017/0286452 A1* | 10/2017 | Gupta | G06F 18/28 |
| 2018/0122148 A1* | 5/2018 | Janzer | G06T 15/503 |
| 2018/0158240 A1* | 6/2018 | Saito | G06V 40/164 |
| 2019/0035149 A1* | 1/2019 | Chen | G06V 40/166 |
| 2022/0286657 A1* | 9/2022 | Oz | H04N 7/157 |
| 2022/0292776 A1* | 9/2022 | Liu | G06T 17/20 |
| 2023/0112302 A1* | 4/2023 | Marks | G06V 10/95 345/419 |

FOREIGN PATENT DOCUMENTS

| | | |
|---|---|---|
| CN | 102509345 A | 6/2012 |
| CN | 104952063 A | 9/2015 |
| CN | 105719326 A | 6/2016 |
| CN | 106157372 A | 11/2016 |
| CN | 107506714 A | 12/2017 |
| CN | 104915641 B | 2/2018 |
| CN | 107680158 A | 2/2018 |
| CN | 107909640 A | 4/2018 |
| CN | 108492373 A | 9/2018 |
| CN | 108898068 A | 11/2018 |
| CN | 108898665 A | 11/2018 |
| CN | 109035388 A | 12/2018 |

OTHER PUBLICATIONS

The State Intellectual Property Office of People's Republic of China, First Office Action in Patent Application No. CN201811627209.5 dated Sep. 7, 2020, which is a foreign counterpart application corresponding to this U.S. Patent Application, to which this application claims priority.
The State Intellectual Property Office of People's Republic of China, Second Office Action in Patent Application No. CN201811627209.5 dated Nov. 23, 2020, which is a foreign counterpart application corresponding to this U.S. Patent Application, to which this application claims priority.
Notification to Grant Patent Right for Invention of Chinese Application No. 201811627209.5 dated Jan. 8, 2021.
Aittala, Miika; "Inverse lighting and photorealistic rendering for augmented reality"; The Visual Computer; 2010.
Arief, Ibrahim, et al., "Realtime Estimation of Illumination Direction for Augmented Reality on Mobile Devices"; 20th Color and Imaging Conference, 2012.
Chai, Xiujuan, et al.; "Pose and Illumination Invariant Face Recognition Based on 3D Face Reconstruction"; Journal of Software, vol. 17, No. 3, Mar. 31, 2006.
Debevec, P.; "Rendering Synthetic Objects into Real Scenes: Bridging Traditional and Image-based Graphics with Global Illumination and High Dynamic Range Photography"; SIGGRAPH98 Conference Proceedings; University of California at Berkeley, 1998.
Fechteler, Philipp, et al.; "Fast and High Resolution 3D Face Scanning"; 2007 IEEE International Conference on Image Processing; Nov. 12, 2007.
Hongwei, Dong, ; "Mesh Deformation Based 3D Facial Modeling From Images"; Journal of Computer-Aided Design & Computer Graphics, vol. 24, No. 7; Jul. 15, 2012.
Hu, Yongli, et al.; "3D Face Reconstruction Based on the Improved Morphable Model"; Chinese Journal of Computers, VI. 28, No. 10; Oct. 12, 2005.
Huber, Patrik, et al.; "A Multiresolution 3D Morphable Face Model and Fitting Framework"; Proceedings of the 11th Joint Conference on Computer Vision, Imaging and Computer Graphics Theory and Applications, 2016.
Kanbara, Masayuki, et al.; "Real-time Estimation of Light Source Environment for Photorealistic Augmented Reality"; In Proc. ICPR, 2004.
Kemelmacher-Shlizerman, Ira, et al.; "3D Face Reconstruction from a Single Image Using a Single Reference Face Shape"; IEEE Transactions on Pattern Analysis and Machine Intelligence vol. 33, No. 2; Mar. 18.
Knorr, Sebastian B., et al.; "Real-Time Illumination Estimation from Faces for Coherent Rendering"; Proc. ISMAR. IEEE, 2014.
Marschner, Stephen R., et al.; "Inverse Lighting for Photography"; In Color and Imaging Conference, 1997.
Meilland, Maxime, et al.; "3D High Dynamic Range Dense Visual SLAM and Its Application to Real-time Object Relighting"; In Proc. ISMAR, 2013.
Sato, Imari, et al.; "Acquiring a Radiance Distribution to Superimpose Virtual Objects onto a Real Scene"; IEEE Transactions on Visualization and Computer Graphics, vol. 5. No. 1, 1999.
Yang, Keyi; "Research on Algorithm of Re-light Illumination Based on Single Face Image"; China Excellent Master's Thesis Full-text Database Information Technology Series, No. 8; Aug. 15, 2017.
Yi, Renjiao, et al.; "Faces as Lighting Probes via Unsupervised Deep Highlight Extraction"; ECCV 2018.
European Patent Office, Supplementary European Search Report pursuant to Article 94(3)EPC, dated Jan. 27, 2022 in Patent Application No. 19905268.9, which is a foreign counterpart to this U.S. Application.
Communication pursuant to Article 94(3)EPC of counterpart EP Application No. 19905268.9 dated Feb. 8, 2022, which is a foreign counterpart to this U.S. Application.
Office Action of Russian Application No. 2021119100 dated Feb. 28, 2022, which is a foreign counterpart to this U.S. Application.
Aldrian, Oswald et al.; "Inverse Rendering of Faces with a 3D Morphable Model"; IEEE Transactions on Pattern Analysis and Machine Intelligence, IEEE Computer Society, USA, vol. 35, No. 5, May 1, 2013 (May 1, 2013), pp. 1080-1093, XP011497460, ISSN: 0162-8828, DOI: 10.1109/TPAMI.2012.206, entire document.
Cao, Xuan et al.; "Sparse Photometric 3D Face Reconstruction Guided by Morphable Models"; Computer Vision Foundation, Feb. 21, 2022.
Manolov, A.I. et al.; "Non-Cooperative Biometric Identification by 3D Facial Models Using High-Resolution Video Cameras"; Feb. 21, 2022.
Wang, Yang et al.; "Face Relighting from a Single Image under Arbitrary Unknown Lighting Conditions"; IEEE Transactions on Pattern Analysis and Machine Intelligence, IEEE Computer Society, USA, vol. 31, No. 11, Nov. 1, 2009 (Nov. 1, 2009), pp. 1968-1984, XP011266766, ISSN: 0162-8828, DOI: 10.1109/TPAMI.2008.244, entire document.
Zhang, Lei et al.; "Face Recognition from a Single Training Image Under Arbitrary Unknown Lighting Using Spherical Harmonics"; IEEE Transactions on Pattern Analysis and Machine Intelligence, IEEE Computer Society, USA, vol. 28, No. 3, Mar. 1, 2006 (Mar.

(56) References Cited

OTHER PUBLICATIONS 1, 2006), pp. 351-363, XP008073260, ISSN: 0162-8828, DOI: 10.1109/TPAMI.2006.53, entire document.

* cited by examiner

ILLUMINATION DETECTION METHOD AND APPARATUS FOR FACE IMAGE, AND DEVICE AND STORAGE MEDIUM

CROSS-REFERENCE TO RELATED APPLICATIONS

This application is a US national stage of international application No. PCT/CN2019/123006, filed on Dec. 4, 2019, which claims priority to Chinese Patent Application No. 201811627209.5, filed on Dec. 28, 2018 and entitled "Face image illumination detection method and device, equipment and storage medium". Both applications are herein incorporated by reference in their entireties.

TECHNICAL FIELD

Embodiments of the present disclosure relate to the field of image processing, and in particular, relate to a method and an apparatus for detecting illumination of a face image, and a device, and a storage medium.

BACKGROUND

With the rapid development of computer technologies, augmented reality (AR) products have been widely used in our daily life. Virtual content in an AR product needs to be seamlessly embedded into a real image, to give a user an immersive feeling that the virtual content is real. Ambient illumination in the real image is detected, and then the same illumination environment is added to a virtual object to improve the reality of the integration between the virtual content and the real environment.

As light propagation is affected by factors such as the geometry and reflectivity of objects in a scene, during acquisition of illumination information in a real scene, operations to acquire an image are complicated, and there can exist large errors in the illumination detection.

SUMMARY

Embodiments of the present disclosure provide a method and apparatus for detecting illumination of a face image, and a device, and a storage medium, to simplify operations for detecting illumination of a face image and improve accuracy of illumination detection.

In one aspect, the embodiments of the present disclosure provide a method for detecting illumination of a face image. The method includes: acquiring a face image to be detected and a three-dimensional face mesh template; acquire a reconstructed face mesh model by deforming the three-dimensional face mesh template based on the face image; determining, based on deformation positions, in the reconstructed face mesh model, of key feature points in the three-dimensional face mesh template, brightness of feature points, corresponding to the key feature points, in the face image; and determining illumination information of the face image based on a corresponding relationship between predetermined brightness of the key feature points and illumination thereof, and the brightness of the feature points, corresponding to the key feature points, in the face image, wherein the corresponding relationship between predetermined brightness of the key feature points and illumination is acquired by training with history face images of which illumination information has been determined, and brightness of feature points, corresponding to the key feature points in the three-dimensional face mesh template, in the history face images.

In another aspect, the embodiments of the present disclosure provide an apparatus for detecting illumination of a face image. The apparatus incudes: an image acquiring module, configured to acquire a face image to be detected and a three-dimensional face mesh template; a face reconstructing module, configured to acquire a reconstructed face mesh model by deforming the three-dimensional face mesh template based on the face image; a brightness determining module, configured to determine, based on deformation positions, in the reconstructed face mesh model, key feature points in the three-dimensional face mesh template, brightness of feature points, corresponding to the key feature points, in the face image; and an illumination information determining module, configured to determine illumination information of the face image based on a corresponding relationship between predetermined brightness of the key feature points and illumination thereof, and the brightness of the feature points, corresponding to the key feature points, in the face image.

In still another aspect, the embodiments of the present disclosure provide a device, the device including: one or more processors; and a storage apparatus, configured to store one or more programs; wherein the one or more programs, when loaded and run by the one or more processors, cause the one or more processors to perform the method according to any embodiment of the present disclosure.

In still another aspect, the embodiments of the present disclosure provide a non-transitory computer readable storage medium storing a computer program, wherein the program, when loaded and run by a processor, causes the processor to perform the method according to any embodiment of the present disclosure.

DETAILED DESCRIPTION

The present disclosure is further described in detail with reference to the accompanying drawings and embodiments. The embodiments described herein are merely intended to explain the present disclosure, rather than to limit the present disclosure. Only a partial structure related to the present disclosure rather than all the structure is shown in the accompany drawings. The embodiments in the present disclosure and the characteristics in the embodiments may be combined mutually in the case of no conflict.

Light propagation is affected by factors such as the geometry and reflectivity of objects in a scene. Therefore, illumination information in a real scene is acquired in the following three manners:

1) Illumination information is acquired by using a special image acquisition method. For example, illumination conditions in the real scene are measured by detecting illumination with acquired image of a mirror ball (light probe) in the real scene, acquiring an omnidirectional real image with a fisheye camera, or recovering three-dimensional information and illumination conditions in the real scene with a depth camera. However, this method requires an onerous image acquisition process, and the operation is complex.

2) Illumination is detected based on markers with predefined geometry and reflective properties placed in the real scene, for example, using ping pong balls and planar markers, square markers, or cube markers. This method does not require an onerous image acquisition process, but has certain requirements on predefined geometric objects and markers, and is thus difficult to apply in a variety of real scenes.

3) Illumination is detected by matching the face images with the reference light source image, wherein the reference light source image corresponding to the face image may be generated with a three-dimensional face model under consideration that face images have similar geometry positions. For example, a coordinate system is established by manually marking eye positions in the face images, and sampling points at the same position in the eye coordinate system from different face images are used as the same geometric corresponding points, such that illumination is detected based on brightness of each geometric corresponding point in different face images. However, in this method, the reference light source image needs to be determined with the three-dimensional face model. As face shapes of different face images change accordingly, the three-dimensional face model is restricted by the face shapes of different face images, and the geometric corresponding points determined based on the reference light source image have certain errors, causing a large error in the illumination detection.

To address the problems that key feature points determined based on the reference light source image have certain errors in different face images due to the three-dimensional face model being restricted by the face shapes in different face images and thus cause a large error in the illumination detection, in the embodiments of the present disclosure, a face mesh model corresponding to the face image is reconstructed with a deformable three-dimensional mesh face template; brightness of corresponding feature points in the face image is determined based on deformation positions of the key feature points in the reconstructed face mesh model; and illumination information of the face image is obtained based on the brightness and a corresponding relationship between predetermined brightness and illumination. The embodiments of the present disclosure solve the problem that a large error exists in illumination detection with a three-dimensional face model in the related art, and improve the detection efficiency and accuracy of illumination detection.

In an embodiment, the method according to the present disclosure may be applicable to an actual AR product to add the same illumination intensity for a virtual object in the corresponding AR product based on the illumination information detected in the face image, to enable the virtual object be seamlessly embedded in the real face image, thus giving the user a feeling that the virtual object is real. The method improves user experience of AR products, such as AR products for trying on virtual objects such as hats and glasses, and also helps to improve a recognition and tracking effect of face recognition and face tracking in face images.

Embodiment 1

Figure 1A:
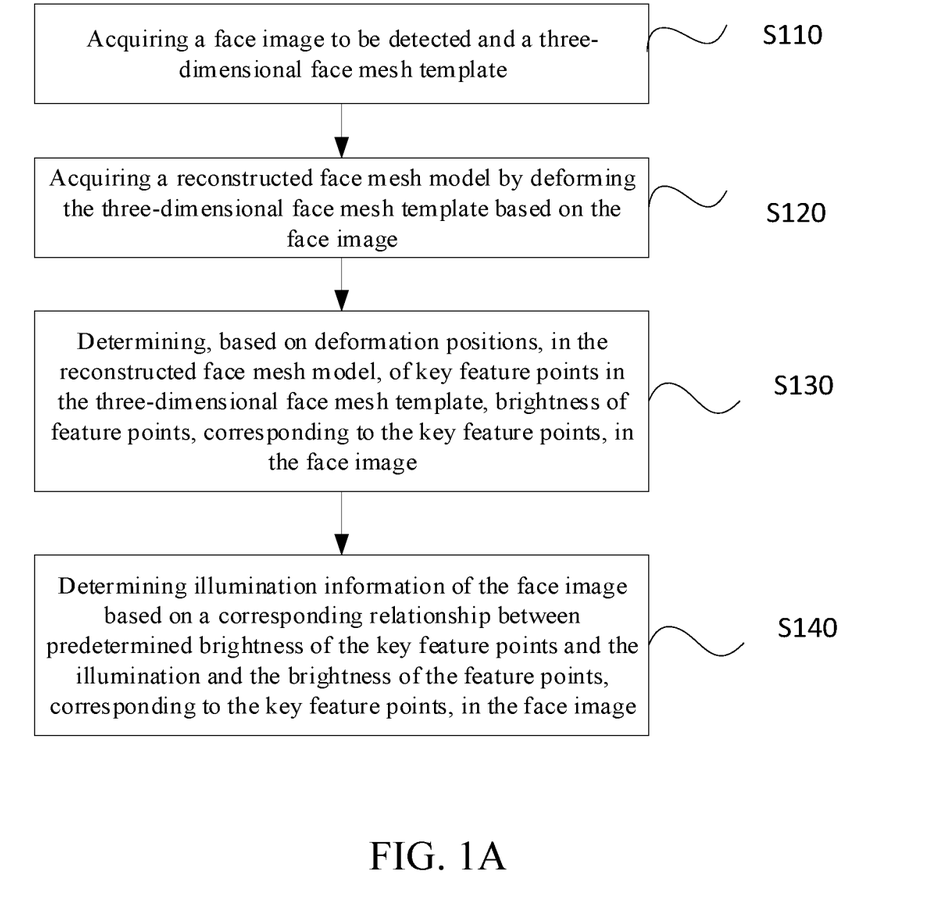
FIG. 1A is a flowchart of a method for detecting illumination of a face image according to an embodiment of the present disclosure.

FIG. 1A is a flowchart of a method for detecting illumination of a face image according to an embodiment of the present disclosure. This embodiment is applicable to any processing device that detects illumination information by using a reconstructed face mesh model. The solution of this embodiment of the present disclosure is applicable to cases of detecting illumination information of a face image. The method according to the embodiment may be performed by an apparatus for detecting illumination of a face image according to the embodiments of the present disclosure. The apparatus may be implemented by software and/or hardware, and integrated in a device for performing the method. The device may be any processing device having an image processing capability.

In an embodiment, referring to FIG. 1A, the method may include S110 to S140.

In S110, a face image to be detected and a three-dimensional face mesh template are acquired.

In an embodiment, a face image includes captured image data that contains a face picture. This embodiment is applicable to detecting illumination of a face image captured in an AR product, to enable a virtual object in the AR product be seamlessly embedded in a real face image. Therefore, the current face image may be captured with an image capture device such as a camera configured in the AR product. In an embodiment, during processing the face image to be detected, pixel information contained in the face image needs to be reduced, such that the processing efficiency of the face image is improved. In this case, the face image is a grayscale image. If the initially acquired face image is a color image, the color image is grayed to obtain the face image to be detected in this embodiment.

Figure 1B:
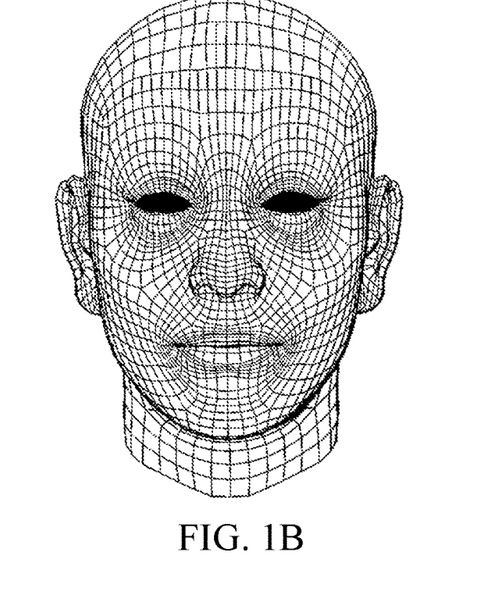
FIG. 1B is a schematic diagram of a three-dimensional face mesh template in the method according to an embodiment of the present disclosure.

In addition, the three-dimensional face mesh template is a mesh model of a standard face shape. In an embodiment, the three-dimensional face mesh template is a three-dimensional face model with a schematic element distribution, which is pre-created based on the standard face shape. During creating the three-dimensional face mesh template, the three-dimensional face mesh template with different precision or different element shapes may be created based on different selected model pixel resolutions and different element shapes, such that element distribution density or element distribution shapes of the created three-dimensional face mesh template is different. For example, the three-dimensional face mesh template shown in FIG. 1B includes quadrilateral elements. In addition, a three-dimensional face mesh template including triangular elements may also be created based on requirements. In this embodiment, prior to detecting the illumination information of the face image, a pre-created three-dimensional face mesh template is stored in the processing device, wherein the processing device performs the method for detecting illumination of a face image. Because the three-dimensional face model is restricted due to different face shapes in different face images, a large error in the illumination detection can be caused. In this embodiment of the present disclosure, by matching the three-dimensional face mesh template with face images containing different face shapes, corresponding deformation can be performed based on the face shapes, and thus avoiding extraction errors of geometric corresponding points due to different face shapes in different face images. Subsequently, for different face images to be detected, the three-dimensional face mesh template may be matched with the face images to acquire reconstructed face mesh models.

Optionally, in this embodiment, during detecting illumination information of the face image, the currently captured face image of which the illumination information needs to be detected (i.e., the face image to be detected) and the pre-stored three-dimensional face mesh template (i.e., the mesh model of a standard face) are acquired. By matching the three-dimensional face mesh template with the current face image to be detected, the reconstructed face mesh model can be obtained. In this embodiment, the same three-dimensional face mesh template is processed, which reduces noise and defect interference in the process of reconstructing corresponding face mesh models based on different face images, and solves the problem that the mesh models directly generated based on different face images have inconsistent topologies.

In S120, a reconstructed face mesh model is acquired by deforming the three-dimensional face mesh template based on the face image.

Optionally, during acquisition of the current face image to be detected and the pre-stored three-dimensional face mesh template, in order to avoid extraction errors of geometric corresponding points due to different face shapes in different face images, the three-dimensional face mesh template may be deformed based on a face shape in the acquired face image, such that a face pose in the deformed three-dimensional face mesh template is approximately the same as a face pose in the face image. The deformed three-dimensional face mesh template is taken as the reconstructed face mesh model based on the face image. In this case, for different face images, a unique face mesh model may be reconstructed accordingly by deforming the elements in the three-dimensional face mesh template. The reconstructed face mesh model has the same mesh vertices as the three-dimensional face mesh template.

In an embodiment, local feature points in the three-dimensional face mesh template may be extracted hierarchically, and a target face mesh model is acquired by deforming the three-dimensional face mesh template based on pose matching positions of the local feature points hierarchically extracted in the face image. Then, global feature points in the target face mesh model are acquired, and the reconstructed face mesh model is acquired by deforming the target face mesh model based on the pose matching positions of the global feature points in the face image.

The feature points are the pixels in the model that can effectively indicate skin features of the face. The brightness change effect of skin points of the face is obvious under effect of different illumination. Therefore, the feature points in this embodiment are pixels in the three-dimensional face mesh template that can indicate the corresponding skin points, that is, multiple mesh vertices or mesh facet centers distributed in the three-dimensional face mesh template, such as centers of quadrilateral elements. Local feature points are part of the feature points contained in the three-dimensional face mesh template. The pose matching positions include matching positions of target parts in the face image, the matching positions being determined based on positions of the face target parts indicated by the multiple feature points in the three-dimensional face mesh template. For example, in the face image, the pose matching position of the feature points indicating the cheek in the three-dimensional face mesh template is the position of the cheek in the face image. The global feature points are all the mesh vertices or mesh facet centers distributed in the target face mesh model. In an embodiment, the local feature points in the three-dimensional face mesh template are hierarchically extracted, and the pose matching positions of the multiple local feature points hierarchically extracted in the face image are determined sequentially; the target face mesh model matched with the face image is acquired by sequentially controlling the corresponding three-dimensional face mesh template to be deformed based on the corresponding pose matching positions. The global feature points in the target face mesh model are acquired, and with reference to the above-mentioned deformation process, the target face mesh model is deformed based on the poses matching positions of multiple global feature points in the face image, such that the reconstructed face mesh model is smooth and more detailed features are reconstructed as well. The reconstructed face mesh model is acquired by adjusting the target face mesh model to be more similar to the face image. In addition, during deforming the three-dimensional face mesh template, when moving with the deformation of the three-dimensional face mesh template, feature points other than the local feature points are moved when certain constraints are met to ensure the consistency of movement of multiple mesh vertices during deforming the three-dimensional face mesh template.

In S130, brightness of feature points, corresponding to the key feature points, in the face image is determined based on deformation positions, in the reconstructed face mesh model, of the key feature points in the three-dimensional face mesh template.

In an embodiment, the key feature points are local feature points that are pre-selected in the three-dimensional face mesh template and may indicate part information of the face image. The key feature points may be different from or the same as the local feature points selected in the three-dimensional face mesh template during the above deformation, which is not limited herein. Optionally, the key feature points in this embodiment are feature points among all the mesh vertices or mesh facet centers, wherein the key feature points mean geometric corresponding positions to some extent and can clearly indicate positions of skin points such as cheeks or chin in the three-dimensional face mesh template except for face feature points such as lips and eyes. The brightness of the feature point is a parameter that can indicate tonal information at the position of the feature point in the face image, that is, the image brightness at the position. The face image in the embodiment is a grayscale image. Therefore, in the face image, the brightness of the feature point corresponding to the key feature point is a pixel grayscale value of the feature point.

Optionally, during acquiring the reconstructed face mesh model by deforming the three-dimensional face mesh template based on the face image, pre-selected key feature points may be determined in the three-dimensional face mesh template. During deforming the three-dimensional face mesh template, the key feature points move accordingly with the deformation of the three-dimensional face mesh template and meet certain constraints to ensure the consistency of movement of multiple feature points in the deformation of the three-dimensional face mesh template. During detecting the illumination information of the face image, the brightness of the corresponding feature points in the face image is acquired in advance. If the key feature points in the three-dimensional face mesh template are determined and the three-dimensional face mesh template is deformed and the reconstructed face mesh model is acquired, corresponding deformation positions of the key feature points in the reconstructed face mesh model may be determined in response to the key feature points being moved accordingly with the deformation of the three-dimensional face mesh template. As the face pose in the reconstructed face mesh model is approximately the same as the face pose in the face image to be detected, feature points in the face image that are at the same positions as the key feature points may be determined as the corresponding feature points, based on the corresponding deformation positions, in the reconstructed face mesh model, of the key feature points, and thus the brightness of the corresponding feature points is acquired. Further, illumination information of the face image is determined based on the brightness and a corresponding relationship between predetermined brightness of the key feature points and illumination thereof.

In S140, illumination information of the face image is determined based on the corresponding relationship between the predetermined brightness of the key feature points and the illumination thereof, and the brightness of the feature points, corresponding to the key feature points, in the face image.

In an embodiment, the corresponding relationship between the predetermined brightness and the illumination may be interpreted as a corresponding transformation relationship that exists between brightness of feature points in a face image and illumination information of the face image. In the embodiment, the corresponding relationship between the predetermined brightness of the multiple key feature points and the illumination thereof may be acquired by training with a large number of history face images of which the illumination information has been determined, and brightness of feature points, corresponding to the key feature points in the three-dimensional face mesh template, in the multiple history face images. The illumination information indicates the illumination of real ambient light corresponding to the current moment when the face image to be detected is captured, and may include a real illumination direction corresponding to the time when the face image is captured.

Optionally, in this embodiment, during acquiring the brightness of the feature points, which correspond to the key feature points in the three-dimensional face mesh template, in the face image, a corresponding relationship between predetermined brightness of the multiple key feature points and illumination thereof may be acquired, and based on the corresponding relationship between the predetermined brightness and the illumination, the brightness of the feature points, corresponding to the key feature points in the three-dimensional face mesh template, in the face image is transformed, and thus illumination information of the face image in the real environment at the time of acquisition is acquired. The same illumination intensity may be added for a virtual object in the corresponding AR product based on the illumination information, that is, to render the virtual object with the same illumination, to enable the virtual object to be seamlessly embedded in the real face image, thus giving the user a feeling that the virtual object is real and improving the user experience of the AR product.

In the technical solution according to the embodiment, the reconstructed face mesh model is acquired by deforming the three-dimensional face mesh model based on the face image to be detected; the brightness of the feature points, which correspond to the key feature points, in the face image is determined based on the deformation positions of the key feature points in the reconstructed face mesh model; and the illumination information of the face image is determined based on the brightness and the corresponding relationship between the predetermined brightness and the illumination. In this way, there is no need to perform an onerous image acquisition process, yet the positions in the face model and the face image are highly matched. The technical solution according to the embodiment solves the problem in the related art that detecting illumination with a three-dimensional face model has a large error resulted from the restriction due to face shapes in different face images, and thus simplifies the operations for detecting illumination of face images, and improves the detection efficiency and accuracy of illumination detection.

Embodiment 2

Figure 2:
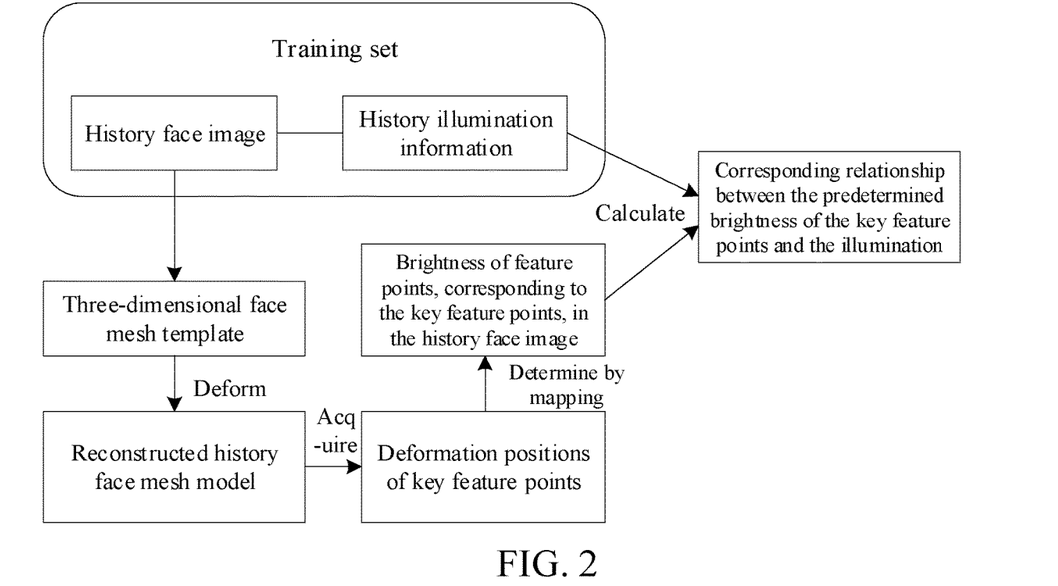
FIG. 2 is a schematic diagram of a principle of a process of predetermining a corresponding relationship between predetermined brightness of key feature points and illumination thereof in the method according to an embodiment of the present disclosure.

FIG. 2 is a schematic diagram of a principle of a predetermining process of a corresponding relationship between predetermined brightness of the key feature points and illumination thereof in the method according to an embodiment of the present disclosure. This embodiment is an optional embodiment based on the above embodiments. A training process of a corresponding relationship between predetermined brightness of the key feature points in a three-dimensional face mesh template and illumination by using a large number of history face images and the three-dimensional face mesh template is described in the embodiment.

Optionally, the embodiment may include S210 to S240.

In S210, history face images and the three-dimensional face mesh template are acquired, and history illumination information of the history face images is determined.

History face images are images containing face pictures whose image illumination information is determined. In this embodiment, prior to determining the corresponding relationship between the predetermined brightness of the key feature points in a three-dimensional face mesh template and the illumination thereof, a large number of history face images with determined illumination information are captured to construct a corresponding training set.

In an embodiment, during the training process of the corresponding relationship between the predetermined brightness of the multiple key feature points and the illumination thereof, a large number of history face images in the training set, and a pre-stored three-dimensional face mesh template may be acquired, and the history illumination information of the multiple history face images may be determined. The history illumination information includes illumination directions of the history face images.

In S220, reconstructed history face mesh models are acquired by deforming the three-dimensional face mesh template based on the history face images.

Due to extraction errors of geometric corresponding points caused by different face shapes in different history face images, in different history face images, face parts represented by feature points corresponding to the key feature points in the three-dimensional face mesh template will have errors, causing a large error in the illumination detection result. To address at least these issues and consider the need to determine the brightness of the feature points corresponding to the key feature points in the three-dimensional face mesh template in the history face images, in this embodiment, based on the reconstruction process of the face mesh model described in Embodiment 1, multiple reconstructed history face mesh models corresponding to the multiple history face images respectively are acquired by deforming, respectively, the same pre-stored three-dimensional face mesh template based on the multiple history face images acquired from the training set, such that the multiple history face mesh models have consistent template topologies. It also ensures the consistency of the face parts represented by the feature points, which correspond to the key feature points, in different history face images.

In S230, brightness of feature points, which correspond to the key feature points, in the history face images is determined based on deformation positions, in the reconstructed history face mesh models, of the key feature points in the three-dimensional face mesh template.

Optionally, during acquiring different reconstructed history face mesh models corresponding to the multiple history face images, as the key feature points in the three-dimensional face mesh template move accordingly with the deformation of the three-dimensional face mesh template, the deformation positions, in the different reconstructed history face mesh models, of the key feature points in the three-dimensional face mesh template, may be determined, wherein the different reconstructed history face mesh models are respectively reconstructed based on the history face images. Thus, based on the corresponding deformation positions of the key feature points in the multiple reconstructed history face mesh models, feature points at the same positions as the key feature points are determined in the multiple history face images, to be taken as corresponding feature points, such that the brightness of the corresponding feature points in the multiple history face images is acquired. The corresponding relationship between the predetermined brightness of the key feature points and the illumination thereof is determined based on the brightness and the illumination information of the multiple history face images acquired in advance.

In S240, the corresponding relationship between the predetermined brightness of the key feature points and the illumination thereof is determined based on history illumination information of the history face image and the brightness of the feature points, corresponding to the key feature points, in the history face images.

Optionally, in response to acquiring the brightness of the feature points, which correspond to the key feature points, in the history face images, and determining the illumination information of the multiple history face images, the corresponding relationship between the predetermined brightness of the each key feature point and the illumination thereof may be determined based on the brightness of the feature points in the multiple history face images and the illumination information of the corresponding history face images. Similarly, the corresponding relationship between the predetermined brightness of the multiple key feature points in the three-dimensional face mesh template and the illumination thereof is determined.

Optionally, during determining the corresponding relationship between the predetermined brightness of the key feature point and the illumination thereof in the embodiment, the step of determining the corresponding relationship between the predetermined brightness of the key feature point and the illumination thereof based on history illumination information of the history face images and the brightness of the feature points, which correspond to the key feature point, in the history face images may include steps described hereinafter.

In S241, for each history face image, a corresponding relationship between initial brightness of the key feature points and illumination thereof is determined based on the history illumination information of the history face image and the brightness of the feature points, corresponding to the key feature points, in the history face image.

In an embodiment, the training set including a large number of history face images, the same processing operation is performed for each history face image during determining the corresponding relationship between the predetermined brightness of the key feature points and the illumination thereof. In this embodiment, for each history face image, during acquiring the brightness of the feature points, which correspond to the multiple key feature points in the three-dimensional face mesh template, in the history face image, a corresponding relationship between initial brightness of the multiple key feature points and illumination thereof corresponding to the history face image may be determined based on the illumination information of the history face image and the brightness of the feature points in the history face image, wherein the feature points corresponds to the multiple key feature points.

For example, the illumination information in the embodiment may be interpreted as spherical harmonic illumination, wherein the spherical harmonic illumination is a vector including illumination feature values in corresponding dimensions and capable of indicating the corresponding illumination information. In this case, for a key feature point $x_j$ in the three-dimensional face mesh template, j is a serial number of the key feature point; in the history face image i, the brightness of the feature point corresponding to the key feature point $x_j$ is $I_{j,i}$. In this case, the corresponding relationship between the initial brightness and the illumination corresponding to the history face image is interpreted by spherical harmonic illumination as $\hat{E}_i = \{\hat{E}_{i,n}\}^T$, wherein $\hat{E}_{i,n}$ is a spherical harmonic illumination of each corresponding key feature point in the history face image. In this case, $\hat{E}_{i,n} = \hat{E}_{i,l(l+1)+m} = y_l^m(\theta,\varphi)$, $l \in \{0, \ldots, L\}$, $m \in \{-l, \ldots, l\}$, wherein $(\theta,\varphi)$ is spherical coordinates of illumination direction in the illumination information of the history face image.

$$y_l^m(\theta, \varphi) = \begin{cases} \sqrt{2} K_l^m \cos(m\varphi) P_l^m(\cos\theta) & m > 0 \\ \sqrt{2} K_l^m \sin(-m\varphi) P_l^{-m}(\cos\theta) & m < 0 \\ K_l^0 P_l^0(\cos\theta) & m = 0 \end{cases}$$

$$K_l^m = \sqrt{\frac{(2l+1)(l-|m|)!}{4\pi(l+|m|)!}}$$

In addition, $P_l^m(x)$ is recursively calculated in the following manner:

$$P_m^m(x) = (-1)^m (2m-1)!!(1-x^2)^{m/2}, \quad \text{1)}$$

wherein $P_0^0(x) = 1$, and $x!!$ is a product of all odd numbers less than x;

$$P_{m+1}^m(x) = x(2m+1) P_m^m \quad \text{2)}$$

$$P_l^m(x) = \frac{x(2l-1) P_{l-1}^m - (l+m-1) P_{l-2}^m}{l-m} \quad \text{3)}$$

wherein L is the degree of the spherical harmonic illumination, which may be any integer value and is not limited in the embodiment.

In this case, in response to acquiring the spherical coordinates of illumination direction $(\theta,\varphi)$ in the illumination information of each history face image, the spherical harmonic illumination of multiple key feature points in the history face image may be obtained according to the above process. The corresponding relationship between the initial brightness of the key feature points and the illumination corresponding to each history face image may be obtained according to the formula:

$$\begin{pmatrix} \hat{E}_1^T \\ \hat{E}_1^T \\ \vdots \\ \hat{E}_K^T \end{pmatrix} \cdot \hat{T}_j = \begin{pmatrix} I_{j,(i=1)} \\ I_{j,(i=2)} \\ \vdots \\ I_{j,(i=K)} \end{pmatrix},$$

wherein $\hat{T}_j$ is the corresponding relationship between the predetermined brightness of the key feature point and the illumination thereof.

In S242, the corresponding relationship between the predetermined brightness of the key feature points and the illumination thereof is acquired by processing the corresponding relationships between the initial brightness and the illumination, which correspond to the multiple history face images respectively, of the key feature points using a least square method.

Optionally, during acquiring the corresponding relationships between the initial brightness of each key feature point and the illumination thereof, wherein the corresponding relationships between the initial brightness and the illumination correspond to multiple history face images respectively, that is, $\hat{T}_j$ in the above formula, the corresponding relationships between the initial brightness of the key feature points and the illumination thereof corresponding to the multiple history face images may be processed using a least square method. That is, the obtained $\hat{T}_j$ corresponding to each key feature point in the multiple history face images is processed. The optimal corresponding relationship between the brightness the multiple key feature points and the illumination thereof is found by minimizing the sum of squares of errors, wherein the multiple feature points correspond to the multiple history face images respectively. The corresponding relationship between the predetermined brightness of each key feature point and the illumination thereof is acquired. Thus, the sum of squares of errors between the corresponding relationships between the initial brightness and the illumination, which are acquired based on different history face images, and the corresponding relationship between the predetermined brightness and the illumination is minimized.

In the technical solution according to the embodiment, the reconstructed history face mesh models corresponding to the history face images are acquired by deforming the three-dimensional face mesh template based on a large number of history face images. Thus, the corresponding relationship between the predetermined brightness of each key feature point and the illumination thereof is acquired based on the history illumination information of the multiple history face images and the brightness of the feature points, corresponding to the multiple key feature points, in the multiple history face images. A large number of history face images are acquired in advance in a data-driven manner, such that the accuracy of the corresponding relationship between the predetermined brightness of the key feature points and the illumination thereof is improved.

Embodiment 3

Figure 3:
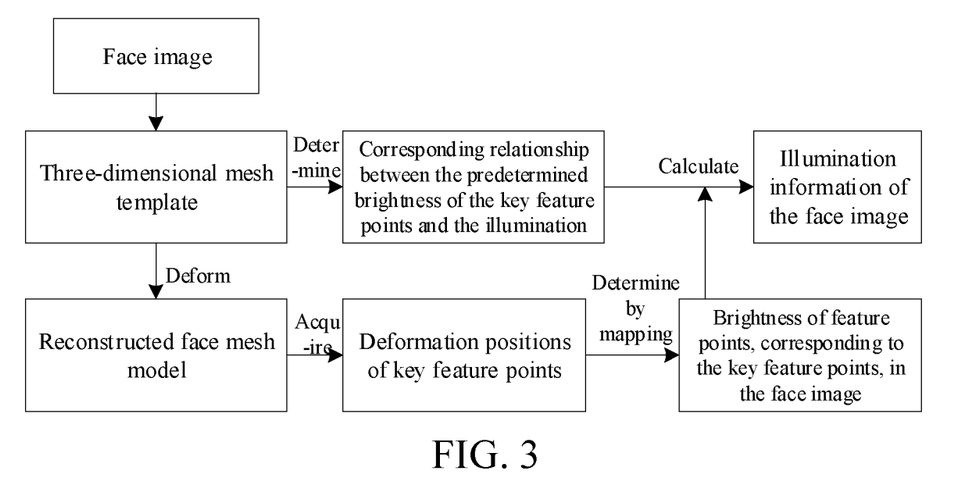
FIG. 3 is a schematic diagram of a principle of an illumination detection process for a face image according to an embodiment of the present disclosure.

FIG. 3 is a schematic diagram of a principle of an illumination detection process for a face image according to an embodiment of the present disclosure. This embodiment is an optional embodiment based on the above embodiments. An illumination detection process for a face image is described in the embodiment.

Optionally, the embodiment may include S310 to S370.

In S310, a face image to be detected and a three-dimensional face mesh template are acquired.

In S320, a reconstructed face mesh model is acquired by deforming the three-dimensional face mesh template based on the face image.

In S330, feature mark points in the three-dimensional face mesh template are acquired as key feature points.

In an embodiment, as there are predetermined key feature points in the three-dimensional face mesh template, the predetermined key feature points are determined in the three-dimensional face mesh template during acquiring the reconstructed face mesh model by deforming the three-dimensional face mesh template based on the face image in the embodiment. The corresponding feature mark points in the three-dimensional face mesh template may be acquired as the predetermined key feature points because the corresponding feature points are manually marked in the three-dimensional face mesh template in the embodiment.

In S340, mapping positions of the key feature points in the face image are determined based on deformation positions, in the reconstructed face mesh model, of the key feature points in the three-dimensional face mesh template.

Optionally, when determining the key feature points in the three-dimensional face mesh template, the key feature points move accordingly with the deformation of the three-dimensional face mesh template during deforming the three-dimensional face mesh template, and meet certain constraints to ensure the consistency of movement of the multiple feature points during the deformation of the three-dimensional face mesh template. In this case, the deformation positions of the key feature points in the reconstructed face mesh model after the movement with the deformation of the three-dimensional face mesh template may be determined. Because the face pose in the reconstructed face mesh model is approximately the same as the face pose in the face image to be detected, the mapping positions of the key feature points in the face image may be determined based on the deformation positions.

In S350, brightness of corresponding feature points at the mapping positions in the face image is acquired as brightness of the feature points, corresponding to the key feature points, in the face image.

In an embodiment, in response to determining that the key feature points move with the deformation of the three-dimensional face mesh template, the mapping positions of the key feature points in the face image after the movement are determined. Corresponding feature points at the mapping positions in the face image may be directly acquired as the feature points, which correspond to the key feature points, in the face image. In this case, the brightness of the corresponding feature points at the mapping positions in the face image may be directly acquired as the brightness of the feature points, which correspond to the key feature points, in the face image.

In S360, a spherical harmonic illumination coefficient of the face image is determined based on the corresponding relationship between the predetermined brightness of the key feature points and the illumination thereof, and the brightness of the feature points, corresponding to the key feature points, in the face image.

Optionally, the illumination information of the face image in the embodiment may be interpreted as spherical harmonic illumination. In this case, during acquiring the brightness of the feature points, which correspond to the multiple key feature points, in the face image, the corresponding relationship between the predetermined brightness of the multiple key feature points and the illumination thereof may be acquired, such that the spherical harmonic illumination coefficient of the face image is determined according to the formula:

$$\begin{pmatrix} \hat{T}^T_{j=1} \\ \hat{T}^T_{j=2} \\ \vdots \\ \hat{T}^T_{j=|J|} \end{pmatrix} \cdot \hat{E} = \begin{pmatrix} I_{j=1} \\ I_{j=2} \\ \vdots \\ I_{j=|J|} \end{pmatrix},$$

wherein $\hat{T}_j$ is the corresponding relationship between the predetermined brightness of the key feature point and the illumination thereof, $I_j$ is the brightness of the feature point, corresponding to the key feature point, in the face image and $\hat{E}$ is the spherical harmonic illumination coefficient of the face image.

In S370, illumination information of the face image is determined based on the spherical harmonic illumination coefficient.

Optionally, during acquiring spherical harmonic illumination coefficient of the face image, the illumination information of the face image may be determined based on the spherical harmonic illumination coefficient. For example, $(-\hat{E}[3],-\hat{E}[1],\hat{E}[2])$ is selected from $\hat{E}$ as the illumination direction of the face image.

In the technical solution according to the embodiment, the reconstructed face mesh model is acquired by deforming the three-dimensional face mesh model based on the face image to be detected; the brightness of the feature points, which correspond to the key feature points, in the face image is determined based on the deformation positions of the key feature points in the reconstructed face mesh model; and the illumination information of the face image is determined based on the brightness and the corresponding relationship between the predetermined brightness and the illumination. Thus, there is no need to perform an onerous image acquisition process, and the positions in the face model and the face image are highly matched. The technical solution according to the embodiment solves the problem in the related art that detecting illumination with a three-dimensional face model has a large error due to the restriction by face shapes in different face images, simplifies the operations of detecting illumination of face images, and improves the detection efficiency and accuracy of illumination detection.

Embodiment 4

Figure 4:
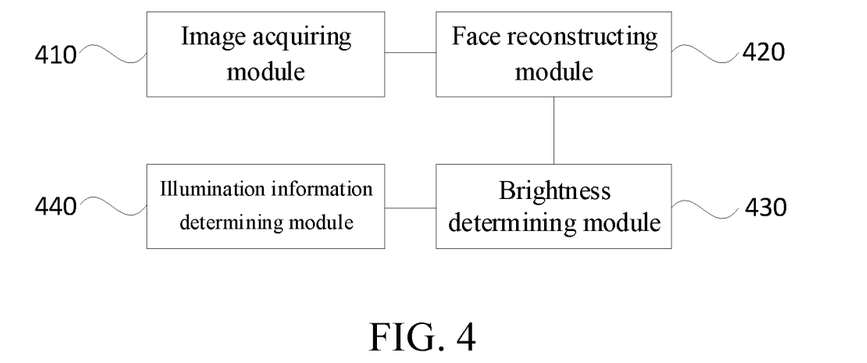
FIG. 4 is a schematic structural diagram of an apparatus for detecting illumination of a face image according to an embodiment of the present disclosure.

FIG. 4 is a schematic structural diagram of an apparatus for detecting illumination of a face image according to an embodiment of the present disclosure. As shown in FIG. 4, the apparatus may include: an image acquiring module 410, a face reconstructing module 420, a brightness determining module 430, and an illumination information determining module 440.

The image acquiring module 410 is configured to acquire a face image to be detected and a three-dimensional face mesh template.

The face reconstructing module 420 is configured to acquire a reconstructed face mesh model b deforming the three-dimensional face mesh template based on the face image.

The brightness determining module 430 is configured to determine, based on deformation positions, in the reconstructed face mesh model, of key feature points in the three-dimensional face mesh template, brightness of feature points, corresponding to the key feature points, in the face images.

The illumination information determining module 440 is configured to determine illumination information of the face image based on a corresponding relationship between the predetermined brightness of the key feature points and the illumination thereof, and the brightness of the feature points, corresponding to the key feature points, in the face images.

In the technical solution according to the embodiment, the reconstructed face mesh model is acquired by deforming the three-dimensional face mesh model based on the face image to be detected; the brightness of the feature points, which correspond to the key feature points, in the face image is determined based on the deformation positions of the key feature points in the reconstructed face mesh model; and the illumination information of the face image is determined based on the brightness and the corresponding relationship between the predetermined brightness and the illumination. There is no need to perform an onerous image acquisition process, and the positions in the face model and the face image are highly matched. The technical solution according to the embodiment solves the problem in the related art that detecting illumination with a three-dimensional face model has a large error due to the restriction by face shapes in different face images, simplifies the operations of detecting illumination of face images, and improves the detection efficiency and accuracy of illumination detection.

The apparatus for detecting illumination of a face image according to the embodiment is applicable to the method for detecting illumination of a face image according to any of the above embodiments, and has corresponding functions and beneficial effects.

Embodiment 5

Figure 5:
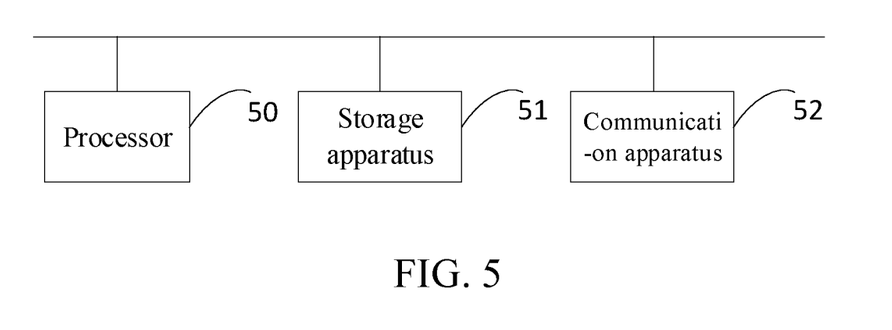
FIG. 5 is a schematic structural diagram of a device according to an embodiment of the present disclosure.

FIG. 5 is a schematic structural diagram of a device according to an embodiment of the present disclosure. As shown in FIG. 5, the device includes a processor 50, a storage apparatus 51, and a communication apparatus 52. There may be one or more processors 50 in the device, and one processor 50 is taken as an example in FIG. 5. The processor 50, the storage apparatus 51, and the communication apparatus 52 in the device may be connected by a bus or in other manners. The bus connection is taken as an example in FIG. 5.

The storage apparatus 51, as a computer readable storage medium, may be configured to store a software program, a computer executable program, and a module, such as a program instruction/module corresponding to the method according to the embodiments of the present disclosure. The processor 50 runs the software program, the instruction, and the module stored in the storage apparatus 51, to perform various functional applications of the device and data processing, that is, perform the method described above.

The communication apparatus 52 may be configured to perform a network connection or a mobile data connection between devices.

The device according to the embodiment may be configured to perform the method according to any of the above embodiments, and has corresponding functions and effects.

Embodiment 6

An embodiment of the present disclosure further provides a computer readable storage medium. The computer readable storage medium stores a computer program. The program, when loaded and run by a processor, causes the processor to perform the method in any of the above embodiments. The method may include:

acquiring a face image to be detected and a three-dimensional face mesh template;

acquiring a reconstructed face mesh model by deforming the three-dimensional face mesh template based on the face image;

determining, based on deformation positions, in the reconstructed face mesh model, of key feature points in the three-dimensional face mesh template, brightness of feature points, corresponding to the key feature points, in the face image; and determining illumination information of the face image based on a corresponding relationship between predetermined brightness of the key feature points and illumination thereof, and the brightness of the feature points, corresponding to the key feature points, in the face image.

This embodiment of the present disclosure provides a storage medium including a computer executable instruction. In addition to performing the above operations of the method, the computer executable instruction may also be executed to perform the method according to any embodiment of the present disclosure.

The units and modules included in the embodiment of the apparatus are merely divided based on functional logic, and are not limited to the above division, in case that the corresponding functions can be implemented. In addition, specific names of the functional units are merely for differentiation.

What is claimed is:

1. A method for detecting illumination of a face image, comprising:

acquiring a face image to be detected and a three-dimensional face mesh template;

acquiring a reconstructed face mesh model by deforming the three-dimensional face mesh template based on the face image;

determining, based on deformation positions, in the reconstructed face mesh model, of key feature points in the three-dimensional face mesh template, brightness of feature points, corresponding to the key feature points, in the face image; and determining illumination information of the face image based on a corresponding relationship between predetermined brightness of the key feature points and illumination thereof, and the brightness of the feature points, corresponding to the key feature points, in the face image, wherein the corresponding relationship between predetermined brightness of the key feature points and illumination is acquired by training with history face images of which illumination information has been determined, and brightness of feature points, corresponding to the key feature points in the three-dimensional face mesh template, in the history face images, wherein prior to acquiring the face image to be detected and the three-dimensional face mesh template, the method further comprises:

acquiring history face images and the three-dimensional face mesh template, and determining history illumination information of the history face images;

acquiring reconstructed history face mesh models by deforming the three-dimensional face mesh template based on the history face images;

determining, based on deformation positions, in the reconstructed history face mesh models, of the key feature points in the three-dimensional face mesh template, brightness of feature points, corresponding to the key feature points, in the history face images; and determining the corresponding relationship between the predetermined brightness of the key feature points and the illumination thereof based on the history illumination information of the history face images and the brightness of the feature points, corresponding to the key feature points, in the history face images, wherein determining the corresponding relationship between the predetermined brightness of the key feature points and the illumination thereof based on the history illumination information of the history face images and the brightness of the feature points, corresponding to the key feature points, in the history face images comprises:

for each history face image, determining a corresponding relationship between initial brightness of the key feature points and the illumination thereof based on the history illumination information of the history face image and the brightness of the feature points, corresponding to the key feature points, in the history face image; and acquiring the corresponding relationship between the predetermined brightness of the key feature points and the illumination thereof by processing the corresponding relationships between the initial brightness of the key feature points and the illumination thereof, corresponding to each of the history face images, using a least square method.

2. The method according to claim 1, wherein determining, based on the deformation positions, in the reconstructed face mesh model, of the key feature points in the three-dimensional face mesh template, the brightness of the feature points, corresponding to the key feature points, in the face image comprises:

determining mapping positions of the key feature points in the face image based on the deformation positions, in the reconstructed face mesh model, of the key feature points in the three-dimensional face mesh template; and acquiring brightness of corresponding feature points at the mapping positions of the key feature points in the face image as the brightness of the feature points, corresponding to the key feature points, in the face image.

3. The method according to claim 2, wherein prior to determining the mapping positions of the key feature points in the face image based on the deformation positions, in the reconstructed face mesh model, of the key feature points in the three-dimensional face mesh template, the method further comprises:

acquiring feature mark points in the three-dimensional face mesh template as the key feature points.

4. The method according to claim 1, wherein the face image is a grayscale image, and the brightness of the feature points, corresponding to the key feature points, in the face image comprises pixel grayscale values of the feature points.

5. The method according to claim 1, wherein determining illumination information of the face image based on the corresponding relationship between the predetermined brightness of the key feature points and the illumination thereof, and the brightness of the feature points, corresponding to the key feature points, in the face image comprises:
determining a spherical harmonic illumination coefficient of the face image based on the corresponding relationship between the predetermined brightness of the key feature points and the illumination thereof, and the brightness of the feature points, corresponding to the key feature points, in the face image; and
determining the illumination information of the face image based on the spherical harmonic illumination coefficient.

6. A device, comprising:
one or more processors; and
a memory, configured to store one or more programs;
wherein the one or more processors, when loading and running the one or more programs, are caused to:
acquire a face image to be detected and a three-dimensional face mesh template;
acquire a reconstructed face mesh model by deforming the three-dimensional face mesh template based on the face image;
determine, based on deformation positions, in the reconstructed face mesh model, of key feature points in the three-dimensional face mesh template, brightness of feature points, corresponding to the key feature points, in the face image; and
determine illumination information of the face image based on a corresponding relationship between predetermined brightness of the key feature points and illumination thereof, and the brightness of the feature points, corresponding to the key feature points, in the face image, wherein the corresponding relationship between predetermined brightness of the key feature points and illumination is acquired by training with history face images of which illumination information has been determined, and brightness of feature points, corresponding to the key feature points in the three-dimensional face mesh template, in the history face images,
wherein prior to acquire the face image to be detected and the three-dimensional face mesh template, the one or more processors are further caused to:
acquire history face images and the three-dimensional face mesh template, and determining history illumination information of the history face images;
acquire reconstructed history face mesh models by deforming the three-dimensional face mesh template based on the history face images;
determine, based on deformation positions, in the reconstructed history face mesh models, of the key feature points in the three-dimensional face mesh template, brightness of feature points, corresponding to the key feature points, in the history face images; and
determine the corresponding relationship between the predetermined brightness of the key feature points and the illumination thereof based on the history illumination information of the history face images and the brightness of the feature points, corresponding to the key feature points, in the history face images;
wherein the one or more processors are further caused to:
for each history face image, determine a corresponding relationship between initial brightness of the key feature points and the illumination thereof based on the history illumination information of the history face image and the brightness of the feature points, corresponding to the key feature points, in the history face image; and
acquire the corresponding relationship between the predetermined brightness of the key feature points and the illumination thereof by processing the corresponding relationships between the initial brightness of the key feature points and the illumination thereof, corresponding to each of the history face images, using a least square method.

7. A non-transitory computer-readable storage medium storing a computer program therein, wherein the program, when loaded and run by a processor, causes the processor to:
acquire a face image to be detected and a three-dimensional face mesh template;
acquire a reconstructed face mesh model by deforming the three-dimensional face mesh template based on the face image;
determine, based on deformation positions, in the reconstructed face mesh model, of key feature points in the three-dimensional face mesh template, brightness of feature points, corresponding to the key feature points, in the face image; and
determine illumination information of the face image based on a corresponding relationship between predetermined brightness of the key feature points and illumination thereof, and the brightness of the feature points, corresponding to the key feature points, in the face image, wherein the corresponding relationship between predetermined brightness of the key feature points and illumination is acquired by training with history face images of which illumination information has been determined, and brightness of feature points, corresponding to the key feature points in the three-dimensional face mesh template, in the history face images,
wherein prior to acquire the face image to be detected and the three-dimensional face mesh template, the program further causes the processor to:
acquire history face images and the three-dimensional face mesh template, and determining history illumination information of the history face images;
acquire reconstructed history face mesh models by deforming the three-dimensional face mesh template based on the history face images;
determine, based on deformation positions, in the reconstructed history face mesh models, of the key feature points in the three-dimensional face mesh template, brightness of feature points, corresponding to the key feature points, in the history face images; and
determine the corresponding relationship between the predetermined brightness of the key feature points and the illumination thereof based on the history illumination information of the history face images and the brightness of the feature points, corresponding to the key feature points, in the history face images; and
wherein the program causes the processor to:
for each history face image, determine a corresponding relationship between initial brightness of the key feature points and the illumination thereof based on the history illumination information of the history face image and the brightness of the feature points, corresponding to the key feature points, in the history face image; and
acquire the corresponding relationship between the predetermined brightness of the key feature points and the illumination thereof by processing the corresponding relationships between the initial brightness of the key feature points and the illumination thereof, corresponding to each of the history face images, using a least square method.

8. The device according to claim 6, wherein the one or more processors are further caused to:

determine mapping positions of the key feature points in the face image based on the deformation positions, in the reconstructed face mesh model, of the key feature points in the three-dimensional face mesh template; and acquire brightness of corresponding feature points at the mapping positions of the key feature points in the face image as the brightness of the feature points, corresponding to the key feature points, in the face image.

9. The device according to claim 8, wherein prior to determine the mapping positions of the key feature points in the face image based on the deformation positions, in the reconstructed face mesh model, of the key feature points in the three-dimensional face mesh template, the one or more processors are further caused to:

acquire feature mark points in the three-dimensional face mesh template as the key feature points.

10. The device according to claim 6, wherein the face image is a grayscale image, and the brightness of the feature points, corresponding to the key feature points, in the face image comprises pixel grayscale values of the feature points.

11. The device according to claim 6, wherein the one or more processors are further caused to:

determine a spherical harmonic illumination coefficient of the face image based on the corresponding relationship between the predetermined brightness of the key feature points and the illumination thereof, and the brightness of the feature points, corresponding to the key feature points, in the face image; and determine the illumination information of the face image based on the spherical harmonic illumination coefficient.

12. The non-transitory computer-readable storage medium according to claim 7, wherein the program causes the processor to:

determine mapping positions of the key feature points in the face image based on the deformation positions, in the reconstructed face mesh model, of the key feature points in the three-dimensional face mesh template; and acquire brightness of corresponding feature points at the mapping positions of the key feature points in the face image as the brightness of the feature points, corresponding to the key feature points, in the face image.

13. The non-transitory computer-readable storage medium according to claim 12, wherein prior to determine the mapping positions of the key feature points in the face image based on the deformation positions, in the reconstructed face mesh model, of the key feature points in the three-dimensional face mesh template, the program further causes the processor to:

acquire feature mark points in the three-dimensional face mesh template as the key feature points.

14. The non-transitory computer-readable storage medium according to claim 7, wherein the face image is a grayscale image, and the brightness of the feature points, corresponding to the key feature points, in the face image comprises pixel grayscale values of the feature points.

* * * * *